US008850301B1

(12) United States Patent
Rose

(10) Patent No.: US 8,850,301 B1
(45) Date of Patent: Sep. 30, 2014

(54) LINKING TO RELEVANT CONTENT FROM AN EREADER

(75) Inventor: Robert Brett Rose, Boulder, CO (US)

(73) Assignee: Google Inc., Mountain View, CA (US)

(*) Notice: Subject to any disclaimer, the term of this patent is extended or adjusted under 35 U.S.C. 154(b) by 184 days.

(21) Appl. No.: 13/412,542

(22) Filed: Mar. 5, 2012

(51) Int. Cl.
*G06F 17/00* (2006.01)

(52) U.S. Cl.
USPC .......................................................... 715/208

(58) Field of Classification Search
CPC ............... G06F 17/30864; G06F 17/30867; G06F 17/30; G06F 17/30967; G06F 17/30011; G06F 17/30899; G06F 17/30598; G06F 17/241; G06F 17/30023; G06F 17/30386; G06F 17/30554; G06F 17/30616
USPC .................................. 715/203, 204, 205, 208
See application file for complete search history.

(56) References Cited

U.S. PATENT DOCUMENTS

| | | | | |
|---|---|---|---|---|
| 5,761,485 | A * | 6/1998 | Munyan ..................... | 715/839 |
| 6,082,776 | A * | 7/2000 | Feinberg .................... | 283/72 |
| 6,122,647 | A | 9/2000 | Horowitz et al. | |
| 7,574,649 | B1 * | 8/2009 | Safars et al. ............... | 715/200 |
| 8,126,878 | B2 * | 2/2012 | Krasnow ..................... | 707/722 |
| 8,214,349 | B2 * | 7/2012 | Bookman et al. .......... | 707/708 |
| 8,276,060 | B2 * | 9/2012 | Hong et al. ................. | 715/230 |
| 8,316,450 | B2 * | 11/2012 | Robinson et al. .......... | 726/26 |
| 8,488,916 | B2 * | 7/2013 | Terman ....................... | 382/315 |
| 8,561,205 | B2 * | 10/2013 | McCurdy et al. .......... | 726/27 |
| 2004/0139400 | A1 * | 7/2004 | Allam et al. ................ | 715/526 |
| 2006/0157559 | A1 * | 7/2006 | Levy et al. ................. | 235/380 |
| 2006/0184566 | A1 * | 8/2006 | Lo et al. ..................... | 707/102 |
| 2006/0235855 | A1 * | 10/2006 | Rousseau et al. ........... | 707/100 |
| 2009/0012946 | A1 * | 1/2009 | Tsunokawa .................. | 707/3 |
| 2009/0177996 | A1 * | 7/2009 | Hunt et al. .................. | 715/788 |
| 2009/0239202 | A1 * | 9/2009 | Stone ........................... | 434/178 |
| 2010/0070921 | A1 * | 3/2010 | Rieman et al. ............. | 715/811 |
| 2010/0131567 | A1 * | 5/2010 | Dorogusker et al. ...... | 707/802 |
| 2010/0192170 | A1 * | 7/2010 | Raleigh ....................... | 725/1 |
| 2010/0228693 | A1 * | 9/2010 | Dawson et al. ............. | 706/12 |
| 2010/0332993 | A1 * | 12/2010 | Bousseton et al. ......... | 715/738 |
| 2011/0082761 | A1 * | 4/2011 | Eglen et al. ................ | 705/26.1 |
| 2011/0087956 | A1 * | 4/2011 | Sherman et al. ........... | 715/233 |
| 2011/0161889 | A1 * | 6/2011 | Scheer et al. ............... | 715/863 |
| 2012/0054672 | A1 * | 3/2012 | McDowell .................. | 715/784 |
| 2012/0113019 | A1 * | 5/2012 | Anderson .................... | 345/173 |
| 2012/0137246 | A1 * | 5/2012 | Pyo .............................. | 715/776 |
| 2012/0151351 | A1 * | 6/2012 | Kilroy et al. ............... | 715/733 |
| 2012/0170490 | A1 * | 7/2012 | Lee et al. ..................... | 370/259 |
| 2012/0173578 | A1 * | 7/2012 | Cheong ....................... | 707/780 |
| 2012/0204086 | A1 * | 8/2012 | Stoner et al. ............... | 715/201 |
| 2012/0204107 | A1 * | 8/2012 | Salinas ........................ | 715/716 |
| 2012/0227002 | A1 * | 9/2012 | Tiwari et al. ............... | 715/765 |

(Continued)

*Primary Examiner* — Laurie Ries
(74) *Attorney, Agent, or Firm* — McDermott Will & Emery LLP

(57) ABSTRACT

Technologies are described for causing an eReader to automatically and dynamically parse a document rendered on the eReader and identify content of potential interest to a user, and, in response to identifying content of potential interest, receiving at a server, from the eReader, the identified content. The server performing heuristics on the identified content at the server in conjunction with searching a network communicatively coupled to the server to locate data contextually relevant to the identified content, and the server transmitting the contextually relevant data from the server to the eReader for presentation to a user through a user interface on the eReader. This Abstract is submitted with the understanding that it will not be used to interpret or limit the scope or meaning of the claims.

30 Claims, 4 Drawing Sheets

(56) References Cited

U.S. PATENT DOCUMENTS

| | | | |
|---|---|---|---|
| 2012/0233539 A1* | 9/2012 | Reed | 715/234 |
| 2012/0236201 A1* | 9/2012 | Larsen et al. | 348/468 |
| 2012/0290609 A1* | 11/2012 | Britt | 707/769 |
| 2012/0311438 A1* | 12/2012 | Cranfill et al. | 715/256 |
| 2012/0330761 A1* | 12/2012 | Cameron | 705/14.73 |
| 2013/0021346 A1* | 1/2013 | Terman | 345/467 |
| 2013/0030853 A1* | 1/2013 | Agarwal et al. | 705/7.13 |
| 2013/0047093 A1* | 2/2013 | Reuschel et al. | 715/753 |
| 2013/0054753 A1* | 2/2013 | Long et al. | 709/219 |
| 2013/0129310 A1* | 5/2013 | Shustorovich et al. | 386/230 |
| 2013/0174035 A1* | 7/2013 | Grab | 715/716 |
| 2013/0191708 A1* | 7/2013 | Song | 715/202 |
| 2014/0019385 A1* | 1/2014 | Dawson et al. | 706/10 |

* cited by examiner

LINKING TO RELEVANT CONTENT FROM AN EREADER

BACKGROUND

Typically, a human manually programs hyperlinks in conventional web pages to cross-reference related subject matter accessible on various networks including the internet. Instead of a manual hyperlink program, an automated hyperlinking program analyzes a web page and links specific content without a manually programmed hyperlink to some external content. This automated hyperlinking is often called "linkifying".

SUMMARY

In general, one implementation of the subject matter described herein may be a technology that automatically and dynamically parses a document rendered on an eReader or Ebook and identifies content of potential interest to a user, and, in response to identifying content of potential interest, receiving at a server, from the eReader, the identified content. The server may then search a network communicatively coupled to the server to locate data contextually relevant to the identified content, and the server may then transmit the contextually relevant data from the server to the eReader for presentation to a user through a user interface on the eReader.

This Summary is not intended to introduce key features or essential features of the claimed subject matter, but merely provides a selection of concepts that are further described in the Detailed Description. Further implementations, features, and advantages, as well as the structure operation of the various implementations are described in detail below with reference to accompanying drawings.

BRIEF DESCRIPTION OF THE DRAWINGS

Implementations are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Implementations of the disclosure describe solutions for providing a desirable user experience while, for example, accessing web pages and reading an Ebook or eReader. A solution linkifies displayed content rendered by an Ebook or eReader in a dynamically updated, nonintrusive, interesting, and personalized manner.

Example Integrated System

Figure 1:
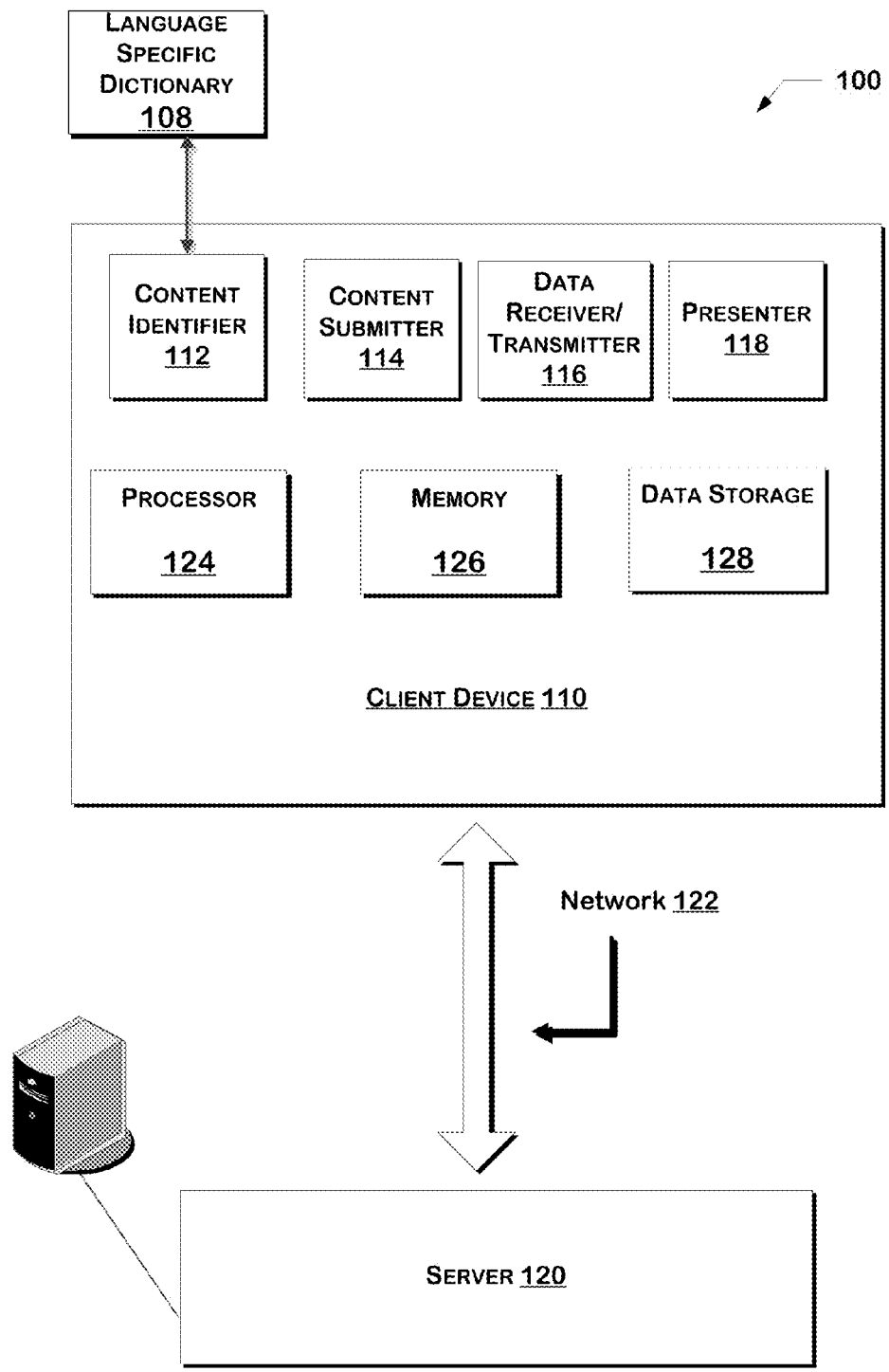
FIG. 1 is a schematic diagram of an integrated system for linking to relevant data in a document in accordance with one or more implementations of the disclosure.

As shown in FIG. 1, an example integrated system 100 may employ the techniques described herein. The system 100 includes at least a client Ebook device 110 or eReader and a server 120.

FIG. 1 illustrates an example eReader 110. This eReader 110 is one possible implementation of a device that employs the new techniques described herein. The eReader 110 includes a content identifier 112, a content submitter 114, a data receiver/transmitter 116, and a presenter 118.

The content identifier 112 is designed to automatically and dynamically identify potentially interesting terms or combinations of terms such as verbs, nouns, place names, geographical features, people's names, names of songs, paragraph headings, section headings, modifiers, etc., in a document being rendered on the device. The content identifier is configured to identify a plurality of terms or phrases from the document presented by the eReader 110 for linkification. The plurality of terms or phrases may be selected by the content identifier of the eReader using a combination of a language specific dictionary 108 and natural language processing techniques.

The content identifier 112 may be configured to employ term frequency-inverse document frequency (tf-idf) numerical statistics to determine how important each of the identified plurality of terms or phrases is to the presented document. Term frequency-inverse document frequency is a numerical statistic which reflects how important a word is to a document in a collection or corpus. It can be used as a weighting factor in information retrieval and text mining. The tf-idf value increases proportionally to the number of times a word appears in the document, but is offset by the frequency of the word in the corpus, which helps to control for the fact that some words are generally more common than others. The content identifier is further configured to access the language specific dictionary 108 over a communicative coupling, as shown in FIG. 1, or to download the language specific dictionary 108 to the eReader 110 in conjunction with a determination of the language of the document presented by the eReader for linkification. The language specific dictionary 108 may be further selected for download to or communicative coupling with the Ebook reader based on one or more of the genre of the document, the technical nature of the subject matter in the document, the advanced level of the subject matter in the document, or whether the document is fiction or non-fiction.

A processing algorithm used by the content identifier in identifying a plurality of terms or phrases in the document being presented by the Ebook can be designed to reduce latency and maximize processing efficiency. One way in which this can be achieved can include decreasing the speed or amount of processing performed in identifying a plurality of terms for linkification as a percentage of the document that has not been linkified decreases. Additionally, the speed of processing can be reduced as the point in the document where the processing is occurring gets farther ahead of the point in the document where a user is reading. Another non-limiting example of dynamic processing that may be performed by the content identifier includes starting the identifying of a plurality of terms or phrases at the point in a document where a reader begins, then continuing on ahead of that point to the end of the document, and then jumping to the beginning of the document and continuing forward from the beginning until catching up with the reader.

A look-up table of well-known names of people, places, or things that would appear frequently across a broad corpus of documents can also be provided. The names, places, or things provided in the look-up table could also be ranked in terms of their importance. The content identifier can be further configured to compare the identified plurality of terms or phrases to the look-up table for an initial set of results for linkification.

Via a network, the content submitter 114 sends these potentially interesting terms or combinations of terms to a server 120 for more extensive processing. "Potentially interesting", as used herein, generally refers to terms and phrases that are more likely than not to be terms or phrases that a user would like to have more information on. Because the content identifier 112 can be configured to perform the identification of terms and phrases dynamically and at a current point in time when a user accesses a document on the Ebook, topics that are in current news and recent events can rank higher in terms of potential interest. Examples of potentially interesting terms include verbs, nouns, place names, geographical features, song names, people's names, paragraph headings, section headings, modifiers in combination with nouns or verbs, etc. Terms that are not likely to qualify as "potentially interesting", and therefore not likely to yield contextually relevant information if searched, may include connecting words, transitional words and phrases, and prepositions. Non-limiting examples of connecting words include and, but, for, or, of, to, in, nor, yet, so, also, again, as well as, besides, coupled with, in addition, accordingly, consequently, furthermore, however, likewise, moreover, nevertheless, otherwise, therefore, then, thus, after, although, though, as, as if, as a result of, because, before, how, if, even if, in order that, since, similarly, that, so that, unless, until, what, whatever, when, whenever, where, wherever, whether, whichever, while, who, whom, and whose.

The eReader 110 receives and sends data from/to the server 120 via network 122. In particular, the data receiver/transmitter 116 is designed to send/receive from the server system. Alternatively, the data receiver/transmitter 116 may be called a communicator or communication unit. More particularly still, the data receiver 116 may be designed to receive, in response to the submission of the identified content, prioritized data from the server 120. The data receiver/transmitter 116 may be configured to receive from the server, in response to the submission of the identified plurality of terms or phrases, a plurality of hyperlinks, each corresponding to one of the submitted terms or phrases.

The presenter 118 is configured to hyperlink the plurality of terms or phrases in the document presented by the Ebook reader and visually indicate that to the user. The presenter includes the visual and audio components of the client device. Through the presenter 118, the user interacts with the device via a user interface (UI). The presenter is configured to present the prioritized data to user through that UI.

The plurality of hyperlinked terms or phrases in the document presented by the Ebook reader may be communicated to a server and made accessible to one or more of other client devices presenting the document to the user or other client devices presenting the document to other users As shown in FIG. 1, the eReader 110 has one or more processors 124, memory 126, and storage 128. The components introduced above (e.g., the content identifier 112, the content submitter 114, the data receiver/transmitter 116, and the presenter 118) may be implemented as a combination of suitable electronic components, which may include hardware, firmware, software, and/or a combination thereof. For example, portions of each component introduced above may be implemented as a program module with processor-executable instructions that may be stored in the memory 126 and executed by the one or more processors 124. Of course, the eReader may have other components and functions that are not depicted. Furthermore, although FIG. 1 illustrates the eReader 110 as containing the above-described components, including a content identifier 112, a content submitter 114, a data receiver/transmitter 116, a presenter 118, one or more processors 124, memory 126, and storage 128, some or all of the components could be contained within a server or within a plurality of servers instead of, or in addition to the eReader.

The eReader 110, alone or in combination with the server 120 communicatively coupled to the eReader 110, may also receive as input prior actions and selections of a particular user. As an example, a user's actions of selecting links for places or geographical points of interest in order to obtain maps or further information when reading articles on the same or different eReaders, could be used to identify categories of content a user is interested in. Later, terms within those categories of content could be linkified for the user. Similarly, if a particular user has clicked on links associated with songs or artists in order to go to a web site to listen to or buy the music, these selections of the user may form part of a user's selection history associated with a user profile located on a server, such that linkification may be performed consistently across multiple devices of a user.

Data, such as a user's actions and interests, can be stored in a private profile, either locally or on the server. As an alternative, a particular user's data can be aggregated with data from other users, without retaining any personally identifiable information on the server.

Linkification can be performed by the client on a local copy of the document. The publisher of the document does not have to do anything to prepare the document, as the content identifier 112 on the client Ebook device or eReader is configured to automatically perform a scan of each document that is loaded onto the eReader. A user of the Ebook device also does not have to do anything special, as the eReader 110 buffers ahead of the point in the document where the user is reading, and dynamically and automatically searches for interesting terms or phrases, including names of places, people's names, song names, nouns, verbs, paragraph headings, etc., which are then sent off to the server for further processing.

The server 120 (i.e., server system) performs an updated search of the internet for current and contextually relevant sources of data based on the interesting terms received from the eReader. The back-end services that can be provided by the server 120 may include maintaining a user profile of the categories of a user's selections and actions with respect to documents when they use various reading devices. Alternatively, a user may operate devices without use of a profile and without recording of any history information. The back-end services provided by the server 120 may further include linking from an interesting term, such as a place mentioned in the document being rendered on the eReader, to one or more maps provided on a map web site, such as map site 256 in FIG. 2, or linking from the name of a song or an artist mentioned in the document being rendered (i.e., presented or displayed) on the eReader 110 to one or more corresponding songs available on a web site that provides for the listening to and purchasing of the songs, such as web site 260 in FIG. 2, or even free song previews that are provided as an inducement to purchase. Links could also be provided to web sites such as movie/video web site 262 in FIG. 2 that provide other content, including movies and/or videos. These web sites could also offer possible options for user actions such as watching the movies/videos, watching free previews, and purchasing or renting the content.

In addition, the server 120 verifies the relevance, interest, and timeliness of data related to the terms or combinations of terms received from the eReader by conducting additional searches of the internet when an initial search turns up a dead link or a non-contextual reference. These additional searches may be based on semantically similar terms or phrases, or terms or phrases initially searched, but with the inclusion of more surrounding modifiers or more specific and descriptive terms to focus in on interesting and even personalized information. The server 120 may use searching protocols that include rules based upon a numerical weighting given to each element of a hyperlinked set of documents, the number and frequency of hits for specific terms on various social media sites, and the number and frequency of click-throughs, or clickthrough rate (CTR) for certain portions of popular texts—as part of the back-end searches performed by the server.

As one non-limiting example, the server may connect to a database, or access internal memory, and determine that a significant number of readers of a popular book on, e.g., the NY Times bestseller list, click on the same links to learn more about certain topics. Based on these patterns of behavior amongst users reading the same document, or even related documents, the server may dynamically and automatically retrieve data that may have a higher likelihood of being of interest to a user. The server then returns the dynamically updated, interesting, and prioritized data back to a data receiver 116 of the client over an asynchronous Hypertext Transfer Protocol (HTTP) connection or other network connection established by a communicator of the Ebook for presentation to the user using the graphical user interface or presenter of the eReader.

While example implementations herein are described in connection with software, hardware, or a combination thereof residing on one more computing devices such as an Ebook, eReader, server, etc., one or more portions of the disclosed techniques and systems may also be implemented via an operating system, application programming interface (API) or a "middle man" object between any of the one or more processors on the various eReaders and server.

With an Ebook or eReader application, the new techniques described herein enable a significantly improved user experience over existing applications by automatically and dynamically providing relevant, interesting, and personalized data through hyperlinks associated with select terms throughout the document. A balance is achieved between providing a user with a desirable amount of contextually relevant information, and avoiding lessening the user experience by providing too many hyperlinks, or intrusive hyperlinks that may interfere with an author's creative presentation of the content rendered on the eReader.

The format of text or documents presented by an Ebook application remains unaffected, and the publisher of the content to be rendered on the Ebook does not have to do anything special to the documents or content. The hyperlinks are desirably provided on an overlay so as to not affect the format of the text. Because an Ebook is typically read in a linear fashion, the eReader may buffer ahead a few pages from where a user is reading, scanning for potentially interesting terms, and sending those selected terms off to the server for more extensive processing. The server then returns data resulting from the in-depth, dynamically updated search of various databases and web sites to the client to be presented in contextually relevant hyperlinks overlaid over the text being rendered by the eReader.

If desired, the hyperlinks provided on an overlay of a document being rendered (i.e., presented or displayed) on an Ebook, or rendered by an Ebook application on an eReader, may include one or more contextually relevant advertisements. As one non-limiting example, when a reference to a particular song is made in the document, a hyperlink could be provided that takes the reader to a music download site where the user may listen to and/or purchase the song. As an incentive to encourage a user to take advantage of such advertisements that may be presented through hyperlinks overlaid on the rendered document, potential advertisers could help to subsidize the purchase of the document provided to a user on the Ebook. A user could voluntarily elect to receive such advertisements in exchange for a reduced price for the document, or even for receiving the document free of charge.

Example Method and Another Example Integrated System

Figure 2:
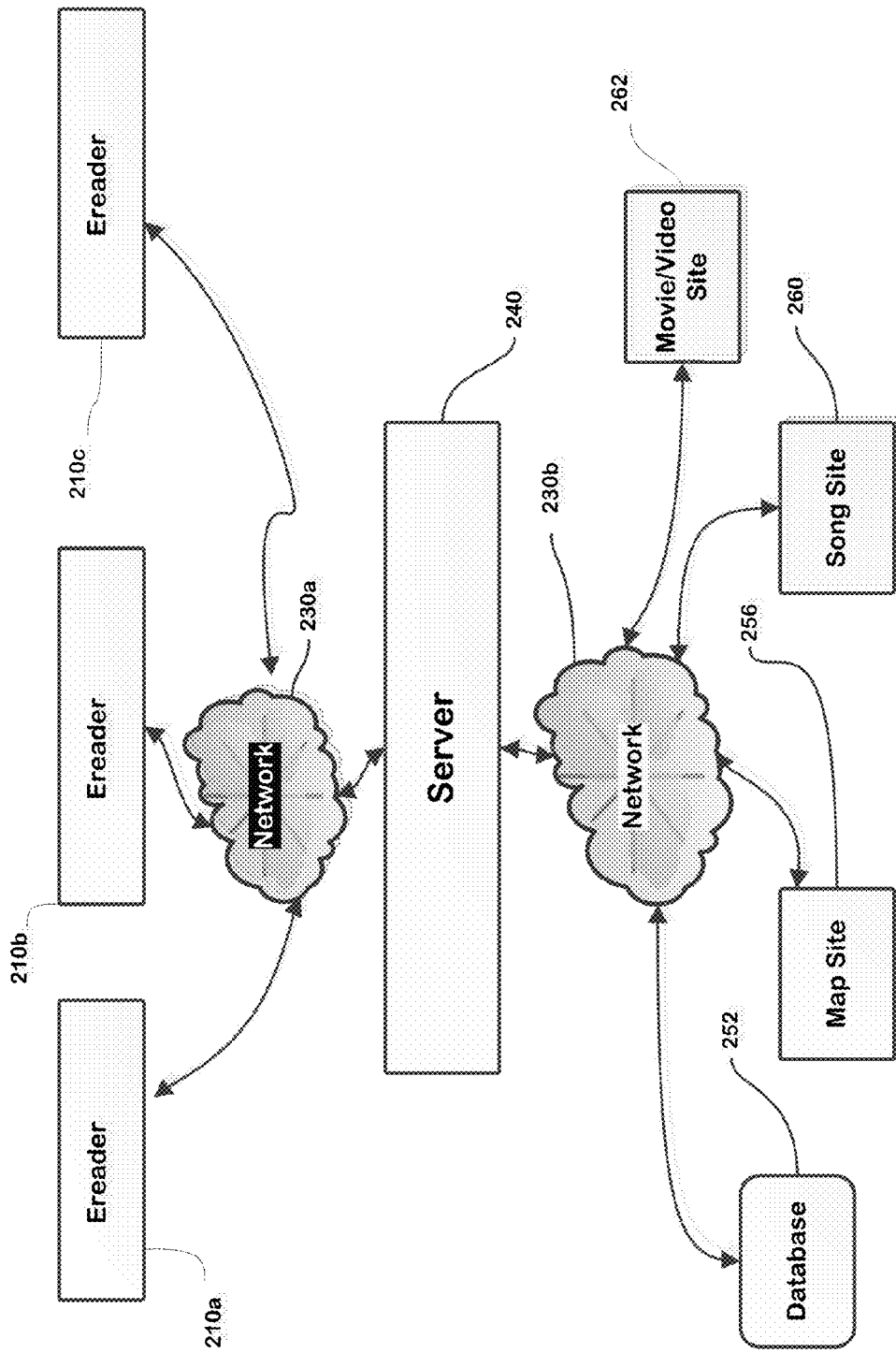
FIG. 2 is a schematic diagram of a system for linking to relevant data in documents being presented by one or more eReaders.
Figure 3:
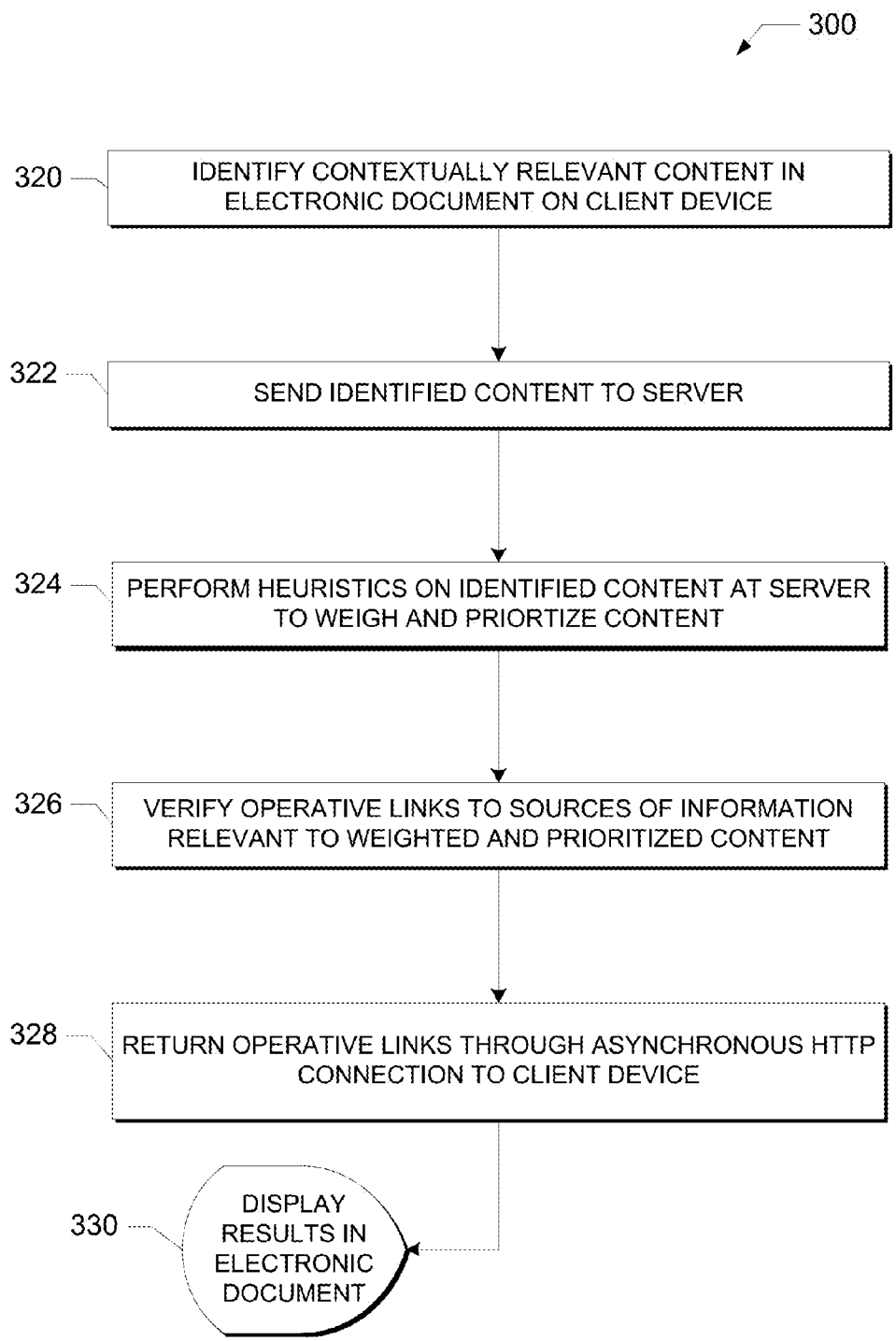
FIG. 3 is a flow chart of a method for linking to relevant data in a document in accordance with one or more implementations of the disclosure.

FIG. 2 provides a schematic diagram of an integrated system according to one implementation of the disclosure. FIG. 3 illustrates an example implementation of a method according to the present disclosure. A plurality of eReaders 210*a*, 210*b*, and 210*c* are shown communicatively coupled to a network 230*a*.

At step 320 in FIG. 3, a client computing device, such as one or more of the eReaders 210*a*, 210*b*, and 210*c* in FIG. 2, automatically and dynamically scans ahead to identify contextually relevant content in an electronic document being rendered on the client computing device. The client computing devices may include an Ebook reader, a smart phone running an eReader application, a personal digital assistant, a laptop computer running a browser with an eReader browser extension, a tablet computer, a personal computer, etc. The client computing device may be configured to process the text and/or images in the electronic document being rendered on the client computing device.

The software, hardware, or combination thereof on the eReader performs semantic text analysis of the document being rendered on the eReader without requiring any pre-processing of the document. Example methods of performing the semantic text analysis may rely on natural language processing (NLP) techniques to identify key terms and phrases within the rendered document while ignoring irrelevant words such as connecting words and prepositions. Non-limiting examples of connecting words and prepositions include: and, but, for, or, of, to, in, nor, yet, so, also, again, as well as, besides, coupled with, in addition, accordingly, consequently, furthermore, however, likewise, moreover, nevertheless, otherwise, therefore, then, thus, after, although, though, as, as if, as a result of, because, before, how, if, even if, in order that, since, similarly, that, so that, unless, until, what, whatever, when, whenever, where, wherever, whether, whichever, while, who, whom, and whose. This processing on the eReader can automatically identify potentially interesting and contextually relevant words and phrases such as proper nouns, adjectives, paragraph headings, names of places, names of songs, names of people, etc.

At step 322 in FIG. 3, the eReader sends the identified content over a network to a server. Referring to FIG. 2, identified, contextually relevant content is sent from eReaders 210*a*, 210*b*, and 210*c* over network 230*a* to a server 240.

At step 324 in FIG. 3, the server 340 performs an updated search of the internet or other local or remote databases for current and contextually relevant sources of data based on the interesting terms received from the eReader. As shown in the example implementation of FIG. 2, server 240 is communicatively coupled over a network 230*b* with various data sources including a database 252, map web site 256, song web site 260, and movie/video web site 262. Provided a user specifically elects to allow the following feature, the back-end services that can be performed by the server 240 may include keeping track of one or more user's preferences and other attributes based on the user's previous selections and behaviors on other devices, platforms, and documents. Data, such as a user's actions and interests, can be stored in a private profile, either locally or on the server. As an alternative, a particular user's data can be aggregated with data from other users, without retaining any personally identifiable information on the server. A user who elected to have their data, preferences, or attributes retained in a user profile, can always later "opt-out" and the data will be removed.

The back-end services provided by the server 240 may further include linking from an interesting term, such as a place, geographical location, town, county, city, state, region, country, continent, etc., mentioned in one or more documents being rendered on one or more of the eReaders 210a, 210b, 210c to one or more maps provided on a map web site 256, or linking from the name of a song or an artist mentioned in the document being rendered on the eReader to one or more corresponding songs available on a web site 260 that provides for the listening to and purchasing of the songs. Additionally, as mentioned above, links may be provided to a movie/video web site 262.

As shown at step 326 in FIG. 3, the server 240 is also configured to verify the relevance, interest, and timeliness of data related to the terms or combinations of terms received from the eReader by conducting additional searches of the internet when an initial search turns up a dead link or a non-contextual reference. These additional searches may be based on semantically similar terms or phrases including more modifiers or more specific and descriptive terms to focus in on interesting and even personalized information. As part of its searching protocol, the server may use a calculation of the number and frequency of hits for specific terms on various social media sites, and the number and frequency of click-throughs, or clickthrough rate (CTR) for certain portions of popular texts.

As shown at step 328 in FIG. 3, the server 240 may then return the dynamically updated, interesting, and prioritized data back to the client 210a, 210b, and/or 210c over an asynchronous HTTP connection.

As shown at step 330 in FIG. 3, the presenter of the eReader, such as the graphical user interface or display of the eReader, presents or displays the results returned from the server 240 to the user. In order to avoid changing the formatting or other copyrightable aspects of the text document being displayed to the user on the Ebook or eReader, the returned results may be presented as an overlay in a seamless and non-intrusive manner to the user. To accommodate the inability of some Ebooks or eReaders to enable a user to point and click on provided links, the eReader may be configured to allow one gesture by the user to simultaneously present all of the returned links on a page. Several non-limiting examples of user gestures may include depressing a button on the device, tapping on the device three times, and selecting a menu choice on the device. The user could then access the dynamically updated, interesting, prioritized, and even personalized data at once with a single gesture, and then return to exactly the point in the document where they left off without losing their place in the document.

The technology described herein may be deployed in part or in whole through a machine that executes computer software, program codes, and/or instructions on one or more processors contained in the eReaders and/or the server. Implementations of the disclosure may include a method on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform.

A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include one or more of a CD-ROM, DVD, memory, hard disk, flash drive, RAM, ROM, cache and the like.

Example Computer System

Figure 4:
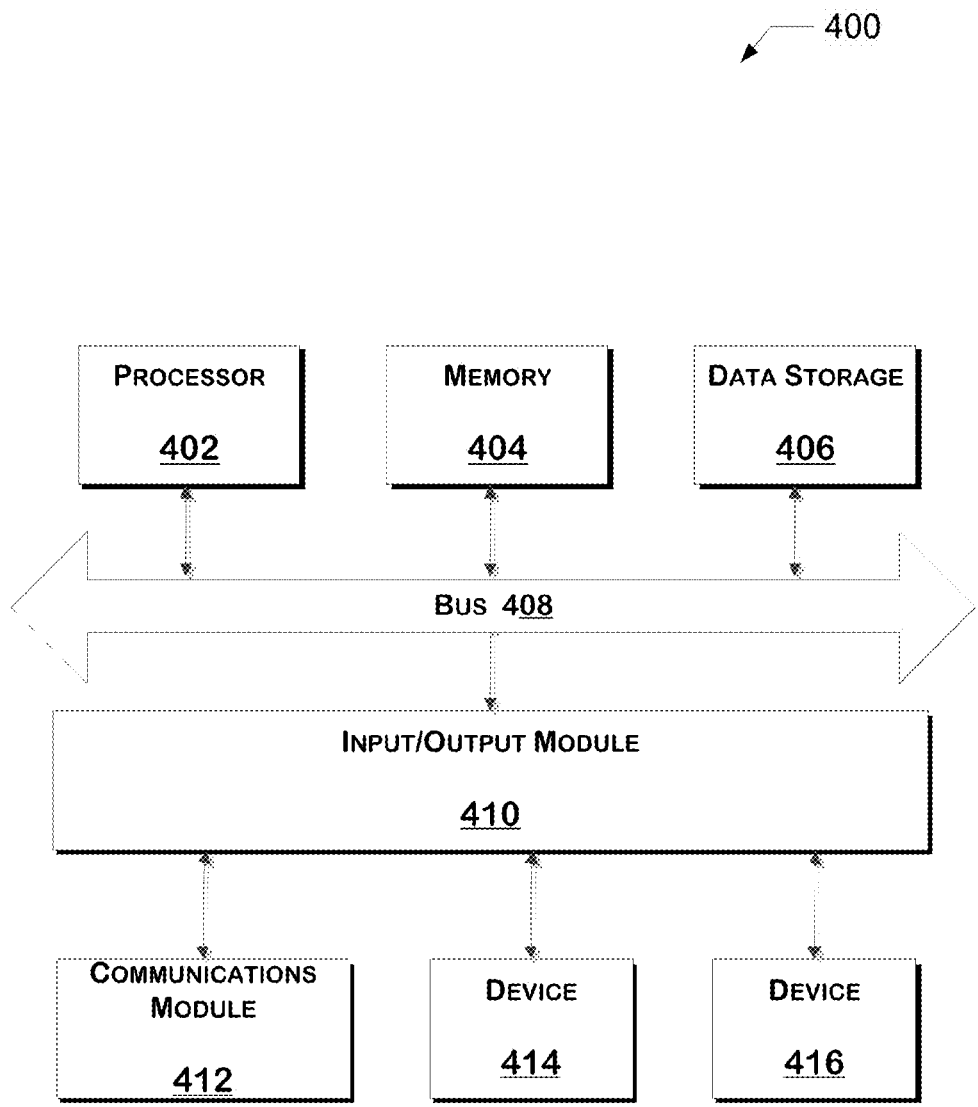
FIG. 4 is a schematic diagram of an example computer system that can be used in one or more implementations of the disclosure.

FIG. 4 is a block diagram illustrating an example computer system 400 with which a eReader 210a, 210b, 210c, and server 240 of FIG. 2 can be implemented. In certain aspects, the computer system 400 may be implemented using hardware or a combination of software and hardware, either in a dedicated server, or integrated into another entity, or distributed across multiple entities.

Computer system 400 (e.g., client 210a, 210b, 210c, and server 240) includes a bus 408 or other communication mechanism for communicating information, and a processor 402 coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. A processor may include one or more cores that may enhance speed and performance of a multiprocessor. In various embodiments, the processor may be a dual core processor, quad core processors, other chip-level multiprocessor and the like that combine two or more independent cores (called a die).

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

A software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of the program across the network. The networking of some or all of these devices may facilitate parallel processing of a program or method at one or more location without deviating from the scope of the disclosed subject matter. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The technologies described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The technologies described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, EVDO, mesh, or other networks types.

The technologies described herein and elsewhere may be implemented on or through mobile devices. The mobile devices may include navigation devices, cell phones, mobile phones, mobile personal digital assistants, laptops, palmtops, netbooks, ultrabooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code, programming instructions or programming language, may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The technologies described herein may transform physical and/or intangible items from one state to another. The technologies described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored as thereon stored as monolithic software structure, as standalone software modules, or as modules that employ external routines, code, services, and so forth, or any combination of these, and all such implementations may be within the scope of the present disclosure. Examples of such machines may include personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 304 and implemented in one or more computer program products, i.e., one or more modules of computer program instructions encoded on a computer readable medium for execution by, or to control the operation of, the computer system 300, and according to any method well known to those of skill in the art, including computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 304 may also be used for storing temporary variable or other intermediate information during execution of instructions to be executed by processor 302.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 illustrated in Fig. further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a CRT (cathode ray tube) or LCD (liquid crystal display) monitor, for displaying information to the user.

According to one aspect of the present disclosure, the eReaders 210a, 210b, and 210c, and server 240, as shown in FIG. 2, can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network, such as communication networks 230a, 230b in FIG. 2. The communication network (e.g., networks 230a, 230b) can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments or implementations can also be implemented in combination in a single embodiment or implementation. Conversely, various features that are described in the context of a single embodiment or implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Embodiments of the disclosure may be implemented on an Ebook reader that is only intermittently communicatively coupled with a server. Data transfer between the Ebook and the server may occur during times when a user initially instantiates a wireless connection for the purpose of downloading a new document, and during subsequent connections such as when the user desires a dynamic update of informational links provided in an overlay of at least the portions of the document being read.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

In the claims appended herein, the inventor invokes 35 U.S.C. §112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. §112, paragraph 6.

What is claimed is:
1. An Ebook reader comprising:
a content identifier configured to identify a plurality of terms or phrases from a document presented by the Ebook reader for linkification, the plurality of terms or phrases being one or more of terms or phrases comprising nouns, verbs, names, places, modifiers, or combinations of the terms or phrases, wherein the plurality of terms or phrases are selected by the Ebook reader using a combination of a language specific dictionary and natural language processing techniques;

a content submitter configured to submit the identified plurality of terms or phrases to a server system;

a data receiver configured to receive from a server system, in response to the submission of the identified plurality of terms or phrases, a plurality of hyperlinks, each corresponding to one of the submitted terms or phrases; and a presenter configured to hyperlink the plurality of terms or phrases in the document presented by the Ebook reader based on the received plurality of hyperlinks, and visually indicate that to the user, wherein the content identifier is further configured to change a speed or amount of processing performed in identifying the plurality of terms or phrases for linkification, based on a percentage of the document that has been linkified.

2. The Ebook reader according to claim 1, wherein:
the content identifier is further configured to distinguish between connecting words or transitional words in the plurality of terms or phrases, and words that are selected from the group consisting of nouns, verbs, names, places, paragraph headings, popular terms from social media, trending terms from social media, and song names.

3. The Ebook reader according to claim 1, wherein:
the content identifier is further configured to examine one or more of a name, Uniform Resource Locator, size, or tags of an image.

4. The Ebook reader according to claim 1, wherein:
the content identifier is configured to employ term frequency-inverse document frequency numerical statistics to determine how important each of the identified plurality of terms or phrases is to the presented document.

5. The Ebook reader according to claim 1, wherein:
the content identifier is further configured to download the language specific dictionary to the Ebook reader in conjunction with a determination of the language of the document presented by the Ebook reader for linkification.

6. The Ebook reader according to claim 5, wherein:
the language specific dictionary is further selected for download to the Ebook reader based on one or more of the genre of the document, the technical nature of the subject matter in the document, the advanced level of the subject matter in the document, or whether the document is fiction or non-fiction.

7. The Ebook reader according to claim 1, further comprising:
a communicator configured to establish an asynchronous HTTP connection between the server system and the Ebook reader through which the data receiver receives the plurality of hyperlinks.

8. The Ebook reader according to claim 1, wherein:
the content submitter is further configured to offer a user the option to provide personal information or other individualized attributes to the server system.

9. The Ebook reader according to claim 1, further including:
a look-up table of well-known names of people, places, or things that would generally appear frequently across a broad corpus of documents; and
the content identifier further configured to compare the plurality of terms or phrases to the look-up table for an initial set of results for linkification.

10. The Ebook reader according to claim 1, wherein:
the content identifier is configured to adjust the speed or amount of processing by reducing the speed or amount of processing performed in identifying the plurality of terms or phrases for linkification as a percentage of the document that has not been linkified decreases.

11. The Ebook reader according to claim 1, wherein:
the plurality of hyperlinked terms or phrases in the document presented by the Ebook reader are communicated to a server and made accessible to one or more of other client devices presenting the document to the user or other client devices presenting the document to other users.

12. A computer implemented method being performed on an Ebook reader having one or more processors and memory storing one or more programs for execution by the one or more processors to perform the method comprising:

identifying a plurality of terms from a document presented by the Ebook reader for linkification, the plurality of terms being one or more of terms or phrases comprising nouns, verbs, names, places, modifiers, or combinations of the terms or phrases, wherein the plurality of terms are selected by the Ebook reader using a combination of a language specific dictionary and natural language processing techniques;

submitting the identified plurality of terms to a server system;

receiving from a server system, in response to the submission of the identified plurality of terms, a plurality of hyperlinks, each corresponding to one of the identified plurality of terms; and hyperlinking the identified plurality of terms in the document presented by the Ebook reader based on the received plurality of hyperlinks, and visually indicating that to the user using the one or more processors, wherein a speed or amount of processing performed in identifying the plurality of terms for linkification changes based on a percentage of the document that has been linkified.

13. The method according to claim 12, wherein:
the identifying a plurality of terms comprises distinguishing between connecting words or transitional words and words that are selected from the group consisting of nouns, verbs, names, places, paragraph headings, popular terms from social media, trending terms from social media, and song names.

14. The method according to claim 12, wherein:
the identifying a plurality of terms comprises examining one or more of the name, Uniform Resource Locator, size or tags of an image.

15. The method according to claim 12, wherein:
the identifying a plurality of terms employs term frequency-inverse document frequency numerical statistics to determine how important each of the identified plurality of terms is to the presented document.

16. The method according to claim 12, wherein:
the identifying a plurality of terms comprises downloading the language specific dictionary to the Ebook reader in conjunction with a determination of the language of the document presented by the Ebook reader for linkification.

17. The method according to claim 16, wherein:
the language specific dictionary is selected for download to the Ebook reader based on one or more of the genre of the document, the technical nature of the subject matter in the document, the advanced level of the subject matter in the document, or whether the document is fiction or non-fiction.

18. The method according to claim 12, further including:
establishing an asynchronous HTTP connection between the server system and the Ebook reader for receiving the hyperlinks from the server.

19. The method according to claim 12, further including:
offering to a user the option to provide personal information or other individualized attributes to the remote server system.

20. The method according to claim 12, wherein:
the Ebook reader comprises one of a dedicated Ebook device, an Ebook application, and an Ebook browser extension.

21. The method according to claim 12, further including:
providing a look-up table of well-known names of people, places, or things that would appear frequently across a broad corpus of documents; and
comparing the plurality of terms to the look-up table for an initial set of quick results for linkification.

22. The method according to claim 12, wherein:
the speed or amount of processing performed in identifying the plurality of terms for linkification decreases as the percentage of the document that has not been linkified decreases.

23. The method according to claim 12, wherein:
the plurality of hyperlinked terms in the document presented by the Ebook reader are communicated to a server and made accessible to one or more of other client devices presenting the document to the user or other client devices presenting the document to other users.

24. The method according to claim 12, wherein:
the hyperlinks received from the server are presented on the Ebook reader as an overlay of the document being presented by the Ebook reader in a manner that does not affect the format of the document being presented on the Ebook reader.

25. The method according to claim 24, further including:
presenting the hyperlinks overlaid on the document being presented on the Ebook reader in response to a user gesture comprising one or more of depressing a button on the device, tapping on the device three times, or selecting a menu choice on the device.

26. An integrated system, comprising:
an Ebook reader and a server communicatively coupled over a network, the Ebook reader and the server each comprising one or more processors and memory storing one or more programs for execution by the one or more processors to implement a plurality of functions comprising:
identifying a plurality of terms from a document presented by the Ebook reader for linkification, the plurality of terms being one or more of terms or phrases comprising nouns, verbs, names, places, modifiers, or combinations of the terms or phrases, wherein the plurality of terms are selected by the Ebook reader using a combination of a language specific dictionary and natural language processing techniques;
submitting the identified plurality of terms to the server;
receiving from the server, in response to the submission of the identified plurality of terms, a plurality of hyperlinks, each corresponding to one of the identified plurality of terms; and
hyperlinking the identified plurality of terms in the document presented by the Ebook reader based on the received plurality of hyperlinks, and visually indicating that to the user using the one or more processors,
wherein a speed or amount of processing performed in identifying the plurality of terms for linkification changes based on a percentage of the document that has been linkified.

27. A computer program product comprising a non-transitory computer readable storage medium having control logic stored therein, the control logic comprising:
computer readable program code which causes an Ebook reader to identify a plurality of terms from a document presented by the Ebook reader for linkification, the plurality of terms being one or more of terms or phrases comprising nouns, verbs, names, places, modifiers, or combinations of the terms or phrases, wherein the plurality of terms are selected by the Ebook reader using a combination of a language specific dictionary and natural language processing techniques;
computer readable program code which causes the Ebook reader to submit the identified plurality of terms to a server communicatively coupled to the Ebook reader;
computer readable program code which causes the Ebook reader to receive from the server a plurality of hyperlinks, in response to the submission of the identified plurality of terms, each of the hyperlinks corresponding to one of the identified plurality of terms; and
computer readable program code which causes the Ebook reader to hyperlink the identified plurality of terms in the document presented by the Ebook reader based on the received plurality of hyperlinks, and visually indicate that to a user,
wherein a speed or amount of processing performed in identifying the plurality of terms for linkification changes based on a percentage of the document that has been linkified.

28. The computer program product according to claim 27, further including:
computer readable program code which causes the Ebook reader to present the hyperlinks to the user as an overlay on the document that does not affect the format of the document being presented on the Ebook reader.

29. An Ebook reader comprising:
a content identifier configured to identify a plurality of terms or phrases from a document presented by the Ebook reader for linkification, the plurality of terms or phrases being one or more of terms or phrases comprising nouns, verbs, names, places, modifiers, or combinations of the terms or phrases, wherein the plurality of terms or phrases are selected by the Ebook reader using a combination of a language specific dictionary and natural language processing techniques;
a content submitter configured to submit the identified plurality of terms or phrases to a server system;
a data receiver configured to receive from a server system, in response to the submission of the identified plurality of terms or phrases, a plurality of hyperlinks, each corresponding to one of the submitted terms or phrases; and
a presenter configured to hyperlink the plurality of terms or phrases in the document presented by the Ebook reader based on the received plurality of hyperlinks, and visually indicate that to the user,
wherein the content identifier is further configured to reduce a speed or amount of processing performed in identifying the plurality of terms or phrases for linkification as a percentage of the document that has not been linkified decreases.

30. A computer implemented method being performed on an Ebook reader having one or more processors and memory storing one or more programs for execution by the one or more processors to perform the method comprising:

identifying a plurality of terms from a document presented by the Ebook reader for linkification, the plurality of terms being one or more of terms or phrases comprising nouns, verbs, names, places, modifiers, or combinations of the terms or phrases, wherein the plurality of terms are selected by the Ebook reader using a combination of a language specific dictionary and natural language processing techniques;

submitting the identified plurality of terms to a server system;

receiving from a server system, in response to the submission of the identified plurality of terms, a plurality of hyperlinks, each corresponding to one of the identified plurality of terms; and hyperlinking the identified plurality of terms in the document presented by the Ebook reader based on the received plurality of hyperlinks, and visually indicating that to the user using the one or more processors, wherein a speed or amount of processing performed in identifying the plurality of terms for linkification decreases as a percentage of the document that has not been linkified decreases.

* * * * *